(12) United States Patent
Kazama

(10) Patent No.: US 6,634,079 B1
(45) Date of Patent: Oct. 21, 2003

(54) OPTICAL FIBER CLEAVER

(75) Inventor: Junichi Kazama, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 09/568,973

(22) Filed: May 11, 2000

Related U.S. Application Data

(63) Continuation of application No. PCT/JP99/04901, filed on Sep. 9, 1999.

Foreign Application Priority Data

Sep. 11, 1998 (JP) ............................................. 10-258680

(51) Int. Cl.⁷ ........................... B23P 23/00; B23G 41/00
(52) U.S. Cl. .................... 29/564.4; 29/33 F; 29/33 M; 29/745; 29/747; 29/755; 81/9.51; 81/9.41; 225/96; 225/101
(58) Field of Search .......................... 29/825, 828, 33.5, 29/38.52, 564.3, 33 M, 755, 564.4; 81/9.51, 9.44, 9.42, 581–597; 225/96, 101, 106, 2

(56) References Cited

U.S. PATENT DOCUMENTS

| | | | | |
|---|---|---|---|---|
| 4,216,004 A | * | 8/1980 | Brehm et al. | 65/2 |
| 4,961,357 A | * | 10/1990 | Butler et al. | 81/9.51 |
| 4,969,703 A | * | 11/1990 | Fyfe et al. | 350/96.2 |
| 5,024,363 A | * | 6/1991 | Suda et al. | 225/96.005 |
| 5,501,385 A | * | 3/1996 | Halpin | 225/96 |
| 5,896,786 A | * | 4/1999 | Akita | 81/9.41 |
| 6,052,880 A | * | 4/2000 | Basavanhally | 29/825 |
| 6,311,581 B1 | * | 11/2001 | Hsieh | 81/9.51 |
| 2002/0070256 A1 | * | 6/2002 | Kazama et al. | 225/96.5 |

* cited by examiner

*Primary Examiner*—Peter Vo
*Assistant Examiner*—Minh Trinh
(74) *Attorney, Agent, or Firm*—Oblon, Spivak, McClelland, Maier & Neustadt, P.C.

(57) ABSTRACT

An optical fiber cleaver, comprising a blade capable of applying a scratch to the outer peripheral surface of an optical fiber and a pusher pushing the optical fiber to cleave it at the scratched part, wherein it further comprises a reverse-running prevention mechanism which prevents the blade which was moved directly and gave scratch to the optical fiber from being directly moved reversely and giving scratch again to the optical fiber, the reverse-running prevention mechanism comprises a cam moved directly in connection with the blade and a cam follower being in contact with the cam and capable of directly moving the pusher, and the cam presses the pusher automatically against the optical fiber for cleavage after the optical fiber has been scratched by the blade and, after the scratch has been given completely, locked with the cam follower so as to suppress the cam from being moved directly in the reverse direction.

3 Claims, 8 Drawing Sheets

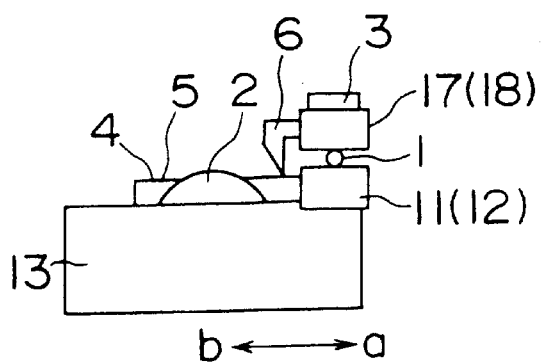
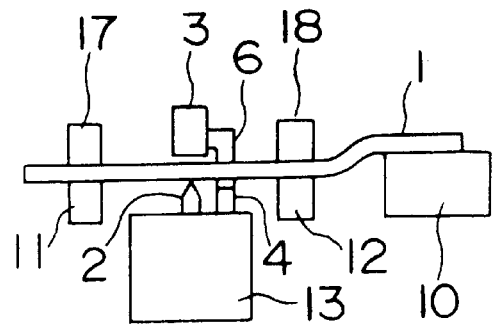
FIG. 3A          FIG. 3B
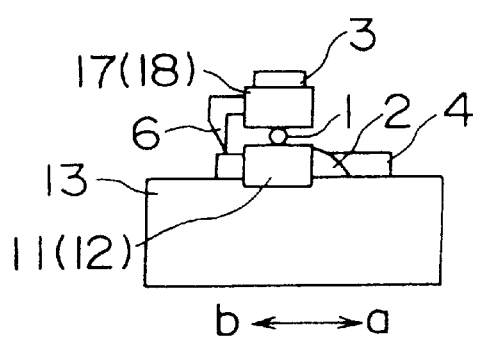
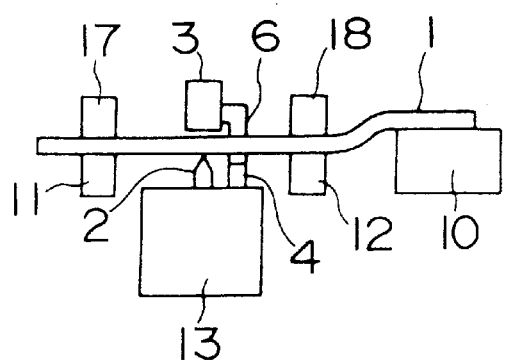
FIG. 3C          FIG. 3D

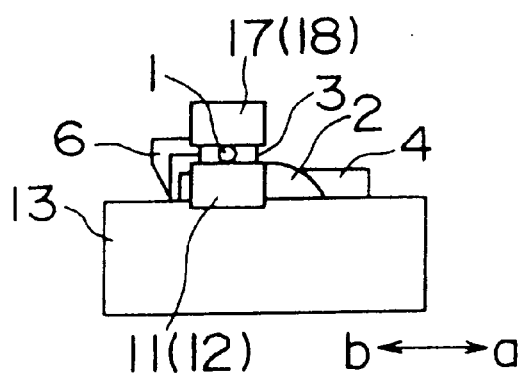
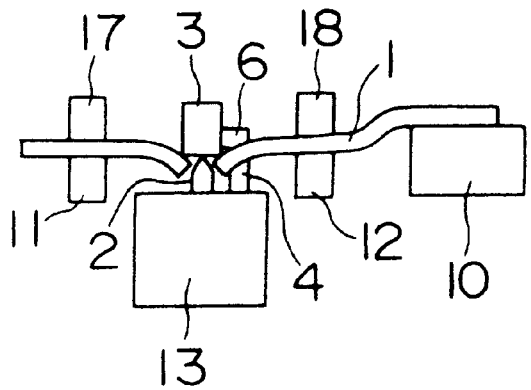
FIG. 3E    FIG. 3F
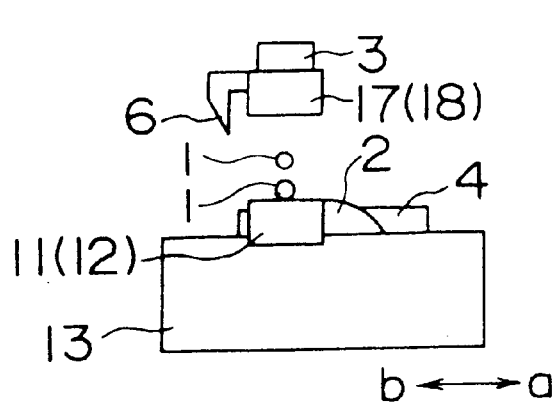
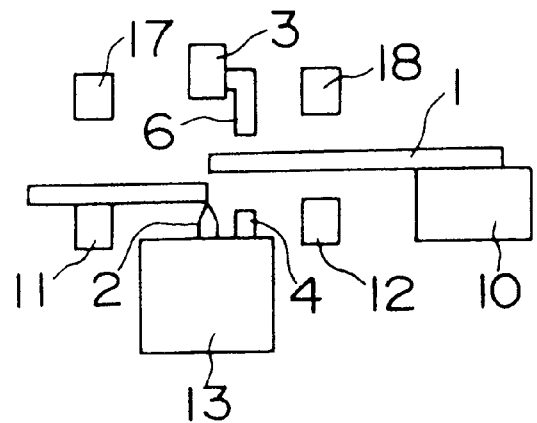
FIG. 3G    FIG. 3H

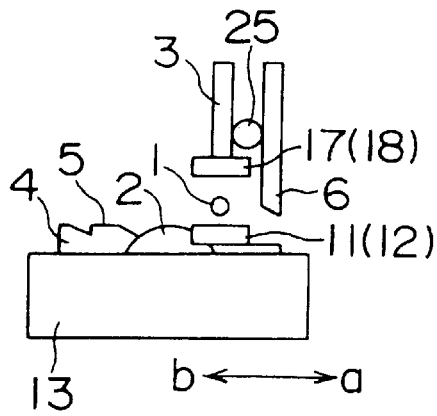
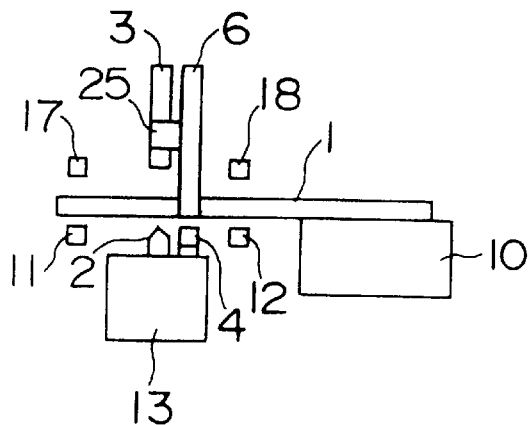
FIG. 5A  FIG. 5B
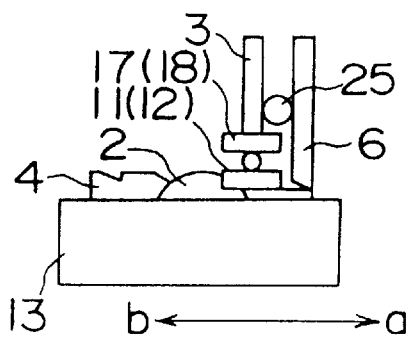
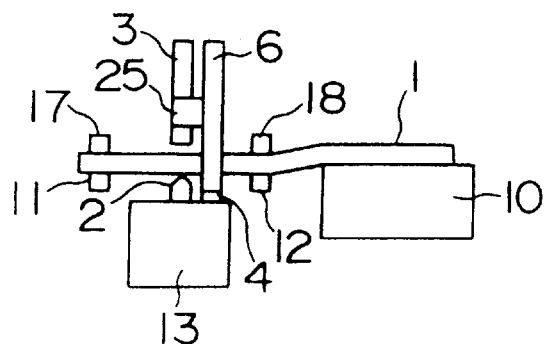
FIG. 5C  FIG. 5D
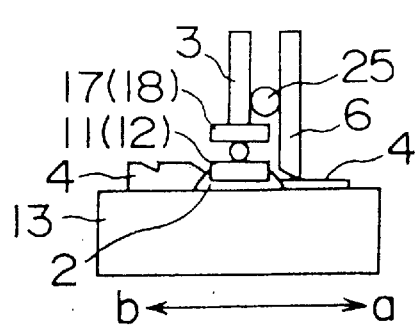
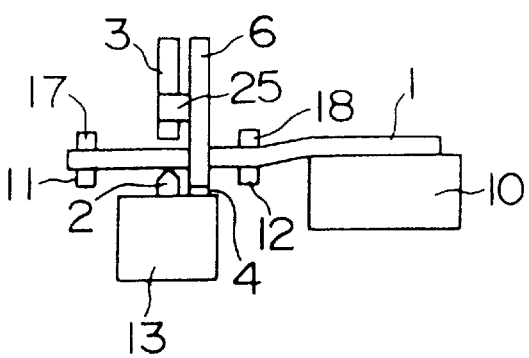
FIG. 5E  FIG. 5F

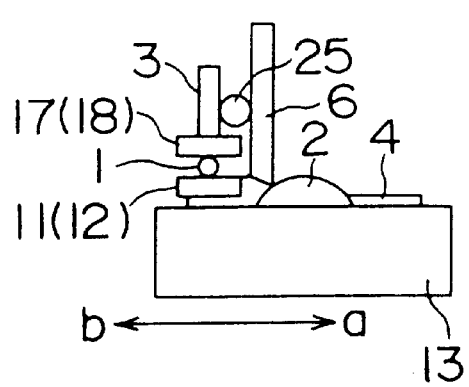
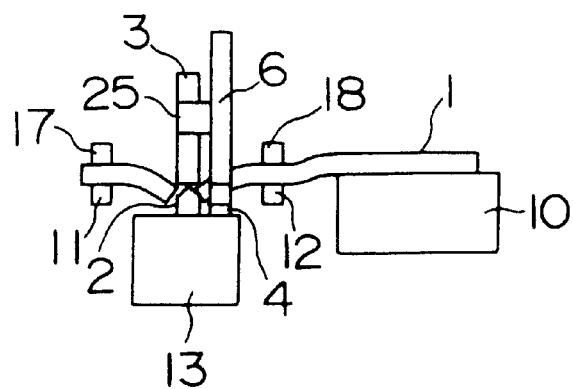
FIG. 5G   FIG. 5H
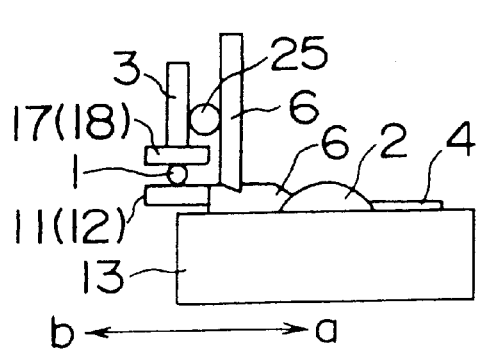
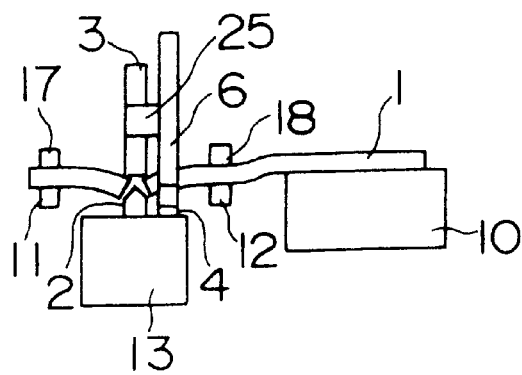
FIG. 5I   FIG. 5J
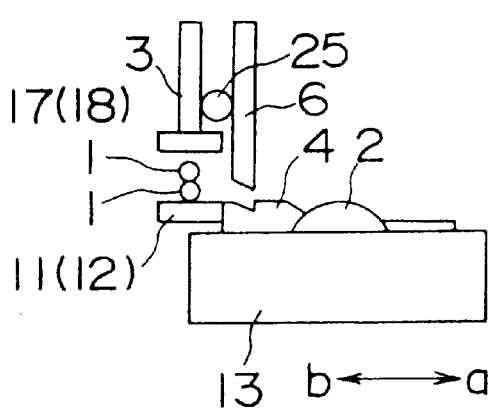
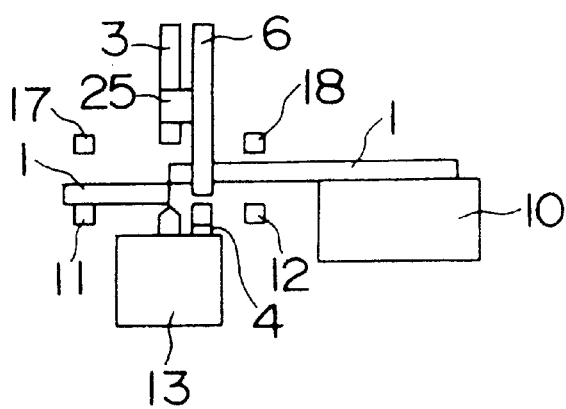
FIG. 5K   FIG. 5L

OPTICAL FIBER CLEAVER

This application is a continuation of PCT/JP99/04901 filed Sep. 9, 1999.

BACKGROUND OF THE INVENTION

1. Field of the Invention

The present invention relates to an optical fiber cleaver for cleaving an optical fiber so that a cleaved section is formed as a mirror surface.

2. Description of the Related Art

An optical fiber has a tendency that, when a scratch is formed on the outer peripheral surface of an optical fiber from which a sheath or coating was peeled and the scratch is grown by pulling or bending the fiber, the fiber is broken at the scratch at once to obtain mirror end surfaces suitable for connection or splicing. In the past, there have been proposed various cleavers for performing such cleaving, including a cleaver proposed by the Inventors, in which a cleaving operation can be facilitated or undesired scratch(s) is not formed in the cleaved surface and therearound. Examples are shown in FIGS. 6 and 7.

FIG. 6 shows an example of a cleaver in which the cleaving operation is facilitated and is a view of the cleaver, looked at from an optical axis of an optical fiber A. In this cleaver, when the optical fiber A from which a coating was peeled is pinched between upper and lower clamp members B, C and a slider D is directly moved in a direction shown by the arrow a, a blade E mounted on a distal end of the slider D gives a scratch to a lowermost part of the optical fiber A, and then, a cam follower F provided on the slider D lifts an end 1 of a pusher G pivoted around a shaft X, with the result that the other end J of the pusher G is lowered to apply stress to the scratch of the optical fiber A, thereby cleaving the optical fiber A at the scratch. In this case, the slider D is automatically slid by a motor H, and the operation is automatically performed by turning ON a switch.

FIG. 7 is a plan view of a cleaver in which an undesired scratch is not formed in the cleaved surface of an optical fiber. In this cleaver, when the optical fiber A from which a coating was peeled is pinched between supporting clamp members L fixed to a base K and pressing clamp members N fixed to a lid plate M and a slider O is directly moved in a direction shown by the arrow a, a blade P mounted on the slider O gives a scratch to a lowermost part of the optical fiber A, and the slider O is stopped by attracting it to a magnet Q disposed in front of the slider. Then, when a pusher R provided on the lid plate M is lowered, stress is applied to the scratch of the optical fiber A by the pusher R, thereby cleaving the optical fiber A at the scratch. Another magnet Q is disposed behind the slider O so that accidental movement of the slider O is prevented.

Although various optical fiber cleavers have been proposed till now, there are few cleavers in which both operability and functionality are excellent. For example, in the cleaver shown in FIG. 6, since the pusher G for applying the stress to the optical fiber A is pivoted around the shaft X, when a multi fiber ribbon fiber is handled, due to difference in distance from the fulcrum, bending strokes between fibers are differentiated not to attain the uniform bending stress, with the result that the uniform mirror surface may not be obtained. Further, in the cleaver shown in FIG. 7, after the scratch was given to the optical fiber A, the slider O is attracted to the magnet Q to prevent undesired scratch from being given to the optical fiber A. However, since the slider O must be returned to its original starting position before starting a next operation, a magnetic force is relatively small. Thus, the slider O may be returned erroneously to give undesired scratch to the optical fiber A.

SUMMARY OF THE INVENTION

According to a first aspect of the present invention, there is provided an optical fiber cleaver comprising a blade movable directly in a direction perpendicular to an optical axis of an optical fiber clamped and capable of giving a scratch to the outer peripheral surface of an optical fiber, and a pusher movable linearly in the direction perpendicular to the optical axis of the optical fiber clamped and for pushing the optical fiber to cleave it at the scratched part and wherein it further comprises a reverse-running prevention mechanism which prevents the blade which was moved directly and gave the scratch to the optical fiber from being directly moved reversely and giving a scratch to the optical fiber again.

According to a second aspect of the present invention, in the optical fiber cleaver, the reverse-running prevention mechanism comprises a cam moved directly in connection with the blade and a cam follower being contacted with the cam and capable of directly moving the pusher, and, after the optical fiber has been scratched by the blade, the cam is locked with the cam follower so as to prevent the cam from being directly moved reversely.

According to a third aspect of the present invention, in the optical fiber cleaver, the reverse-running prevention mechanism comprises a cam moved directly in connection with the blade and a cam follower being contacted with the cam and capable of directly moving the pusher, and the cam presses the pusher automatically against the optical fiber for cleavage after the optical fiber has been scratched by the blade and, after the scratch has been given completely, is locked with the cam follower so as to prevent the cam from being directly moved reversely.

According to a fourth aspect of the present invention, in the optical fiber cleaver, after the optical fiber has been scratched by the blade, the cam lowers the pusher and is capable of maintaining the pusher in a lowered condition thereafter.

BRIEF DESCRIPTION OF THE DRAWINGS

FIGS. 3A to 3H are explanatory views for explaining a fiber cleaving operation of the cleaver of FIG. 1, where FIGS. 3A, 3C, 3E and 3G are side views, and FIGS. 3B, 3D, 3F and 3H are front views;

FIGS. 5A to 5L are explanatory views for explaining a fiber cleaving operation of the cleaver of FIG. 4, where FIGS. 5A, 5C, 5E, 5G, 5I and 5K are side views, and FIGS. 5B, 5D, 5F, 5H, 5J and 5L are front views;

BEST MODES FOR CARRYING OUT THE INVENTION

First Embodiment

Figure 1:
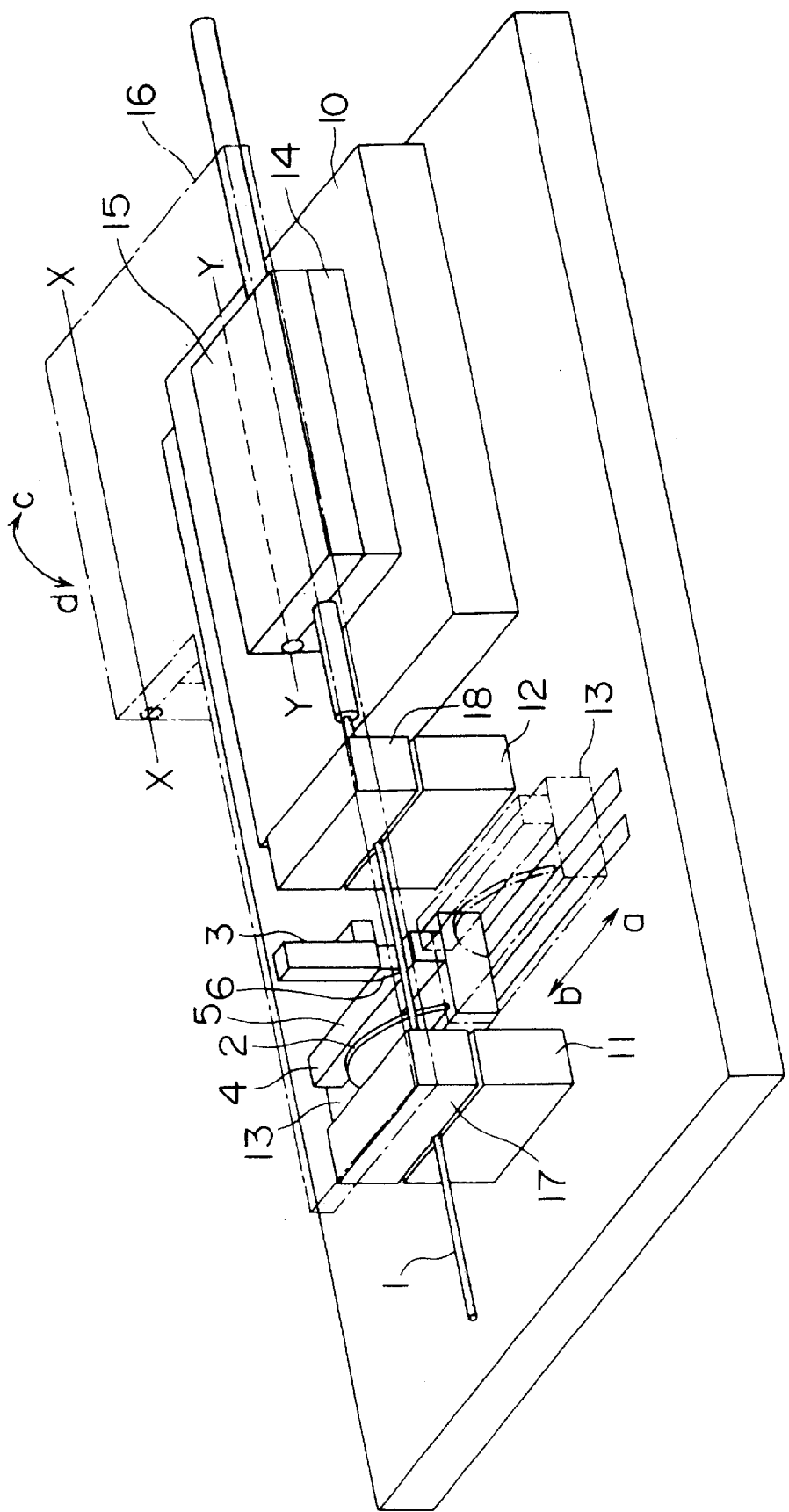
FIG. 1 is a perspective view showing an optical fiber cleaver according to an embodiment of the present invention.

FIG. 1 is a perspective view schematically showing an optical fiber cleaver according to a first embodiment of the present invention. The cleaver comprises fiber resting table 10 on which an optical fiber 1 is laid laterally, and receiving side clamp members 11, 12 for clamping a leading end portion (a portion of the fiber from which a coating was peeled) of the optical fiber 1 set on the fiber resting table 10, and a slider 13 is disposed between the receiving side clamp members 11 and 12 for sliding movement in a direction (a-b direction) perpendicular to an optical axis of the clamped optical fiber 1.

In the fiber resting table 10, the optical fiber 1 is laid on an optical fiber setting portion 14 on the table, and, by pivoting a fiber hold-down member 15 in a direction shown by the arrow c around an axis Y—Y, the optical fiber 1 can be fixed by the fiber hold-down member 15.

Although the receiving side clamp members 11, 12 can receive the leading end portion of the optical fiber 1 set on the fiber resting table 10 from the above and support the leading end portion, in this case, as shown in FIG. 3B, since fiber supporting surfaces of the receiving side clamp members 11, 12 are positioned lower than a fiber supporting surface of the fiber resting table 10, the optical fiber 1 does not contact with the clamp members 11, 12 (and maintain a floating condition) until the optical fiber 1 is held down by hold-down side clamp members 17, 18 which will be described later.

Figure 2:
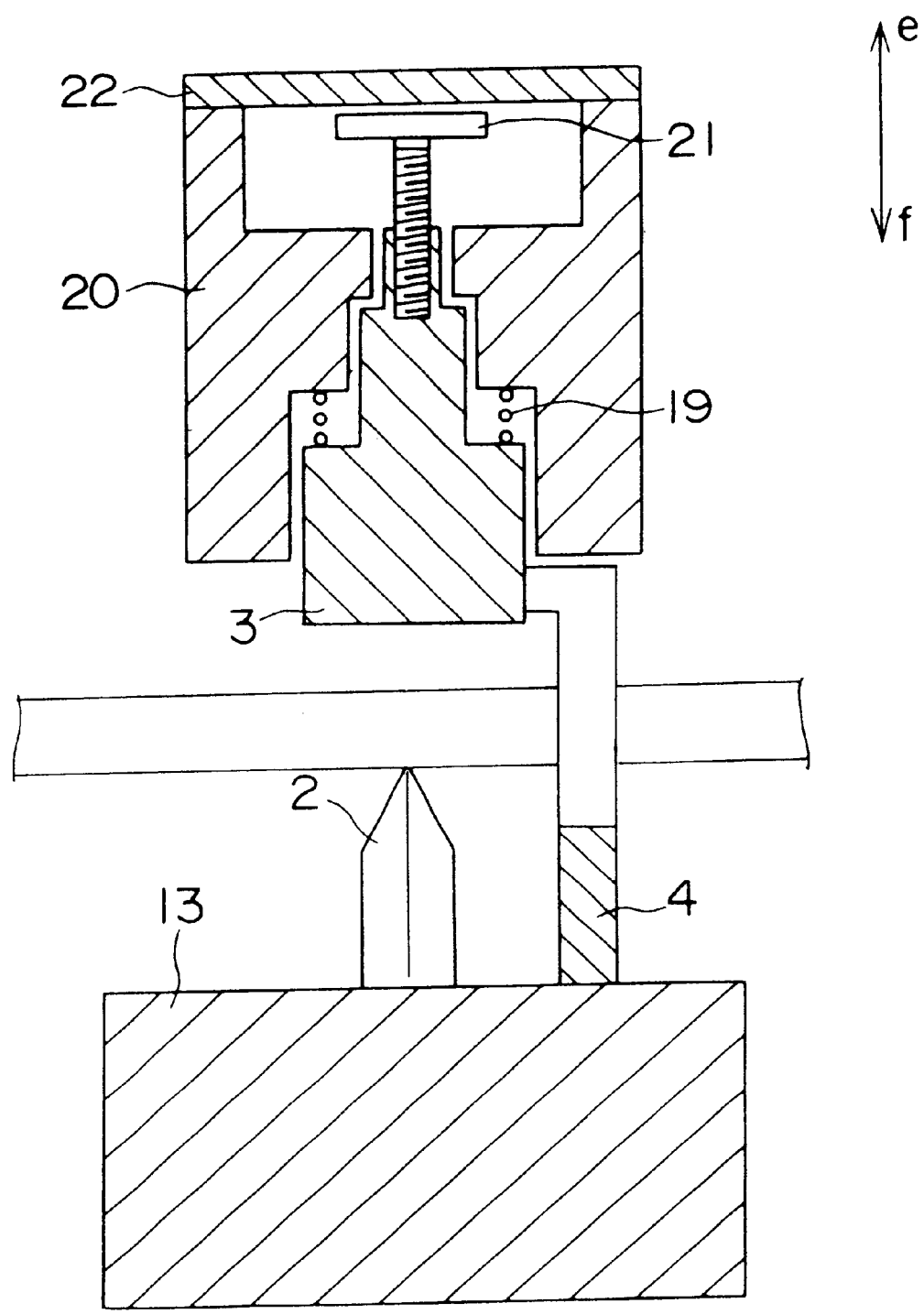
FIG. 2 is a sectional view for explaining a relationship between a pusher and a cam follower and a cam in the cleaver of FIG. 1.

A sharp and hard blade 2 and an elongated prismatic cam 4 are fixed onto the slider 13. The blade 2 has semi-circular side surfaces so that it can give a scratch to a lowermost part of the clamped optical fiber 1 smoothly without applying an excessive force, and a height of the blade is selected so that an uppermost edge of the blade is lightly contacted with the lowermost part of the optical fiber 1 (FIG. 2). The cam 4 is disposed aside the blade 2 in parallel with the latter and can be moved directly in the directions a-b in FIG. 1 together with the blade 2. The cam 4 is designed (or configured) so that it can support a cam follower 6 while resting it on the cam, from a position (FIG. 3A) where the slider 13 has completely been retarded in the direction b to a position (FIG. 3C) where the slider is slid in the direction a to cause the blade 2 to give the scratch to the optical fiber 1 completely, and can unload the cam follower 6 downwardly at a position (FIG. 3E) after completion of application of scratch.

A lid plate 16 pivotable around an axis X—X is provided aside the fiber resting table 10. The lid plate 16 is provided with two hold-down side clamp members 17, 18 and a pusher 3. When the lid plate 16 is pivoted in a direction shown by the arrow c in FIG. 1 to be closed, the hold-down side clamp members 17, 18 can overlap onto the corresponding receiving side clamp members 11, 12, thereby clamping the bare portion of the optical fiber 1 between the clamps 11, 12 and 17, 18. Further, when the lid plate 16 is opened by pivoting it in a direction shown by the arrow d, the optical fiber 1 can be unclamped.

The pusher 3 is disposed between the hold-down side clamp members 17 and 18. As shown in FIG. 2, the pusher 3 is housed in a cylinder 20 fixed to the lid plate 16 so that the pusher can be moved directly in a thickness direction of the lid plate 16. In this case, a coil spring 19 is provided between the cylinder 20 and the pusher 3 to protrude the pusher 3 from a rear surface of the lid plate 16. As shown in FIGS. 1 and 3, a hook-shaped cam follower 6 is provided aside the pusher 3 so that, when the lid plate 16 is closed, a lower end of the pusher 3 is positioned immediately above the optical fiber 1 and the cam follower 6 is positioned in a sliding path of the cam 4. When the slider 13 is in a position shown by the solid line in FIG. 1 (a position shown in FIG. 3A and 3B), the cam follower 6 rides on the cam 4 and is held in a lifted condition, with the result that the pusher 3 is also lifted to be retarded above the optical fiber 1. However, when the slider 13 is slid in the direction a to reach a position shown by the broken line in FIG. 1 (a position shown in FIG. 3C and 3D), the cam follower is disengaged from the cam 4 and is dropped, with the result that the pusher 3 is lowered to push the outer peripheral surface of the optical fiber 1 from the above. Since opposed surfaces of the cam follower 6 and the cam 4 are vertical as shown in FIG. 3E, once the cam follower 6 is disengaged from the cam 4 and is dropped, the cam follower cannot ride on the cam 4 again, with the result that the blade 2 cannot be returned to the direction b together with the cam 4. Incidentally, in FIG. 2, the reference numeral 21 denotes a dislodgement preventing screw for preventing the pusher 3 from being dislodged downwards from the cylinder 20; and 22 denotes a blind lid.

Now, an optical fiber cleaving sequence of the optical fiber cleaver will be explained.

(1) As shown in FIG. 1, the optical fiber 1 is set on the fiber resting table 10. In this case, the slider 13 is previously retarded in the direction b.

(2) The lid plate 16 shown in FIG. 1 is closed to pinch the optical fiber 1 between the clamp members 11, 12 and 17, 18, as shown in FIGS. 3A and 3B.

(3) The slider 13 is slid in the direction a.

(4) When the slider 13 reaches the position shown in FIG. 3C, the blade 2 gives the scratch to the lowermost part of the optical fiber 1. In this case, the cam follower 6 still rides on the cam 4 so that the pusher 3 is retarded above the optical fiber 1 (FIG. 3D).

(5) When the slider 13 reaches the position shown in FIG. 3E, the application of the scratch to the lowermost part of the optical fiber 1 by means of the blade 2 is completed, and the cam follower 6 is disengaged from the cam 4 to lower the pusher 3, with the result that the optical fiber 1 is broken at the scratch (FIG. 3F). In this condition, if the slider 13 tries to be retarded in the direction b, since the cam follower 6 cannot ride on the cam 4, the slider cannot be retarded. Further, since the pusher 3 is in the lowered condition, end faces of the broken optical fibers are not contacted with each other, thereby preventing the end faces from being damaged.

(6) The lid plate 16 is opened to release the clamping of the optical fiber 1 by means of the clamp members 11, 12, 17, 18. Since the optical fiber 1 set on the fiber resting table 10 is jumped upwardly as shown in FIG. 3H, it does not contact with the blade 2, and, since the opposite side waste fiber remains on the receiving side clamp member 11 lower than the fiber resting table 10, the optical fiber on the table does not contact with the waste fiber, with the result that undesired scratch (damage) is not applied to the optical fiber 1 on the fiber resting table 10. Further, by opening the lid plate 16, the cam follower 6 is disengaged from the cam 4 completely, with the result that the slider 13 can be moved freely. Thus, by shifting the slider in the direction b, a next cleaving operation can be started.

Second Embodiment

Figure 4A:
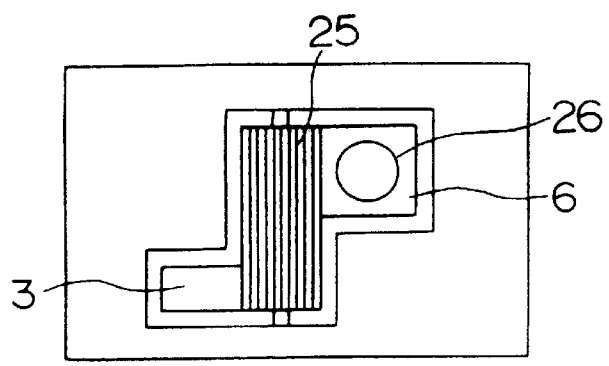
FIGS. 4A and 4B are sectional views of an optical fiber cleaver according to another embodiment of the present invention, showing a relationship between a pusher and a cam follower and a cam.
Figure 4B:
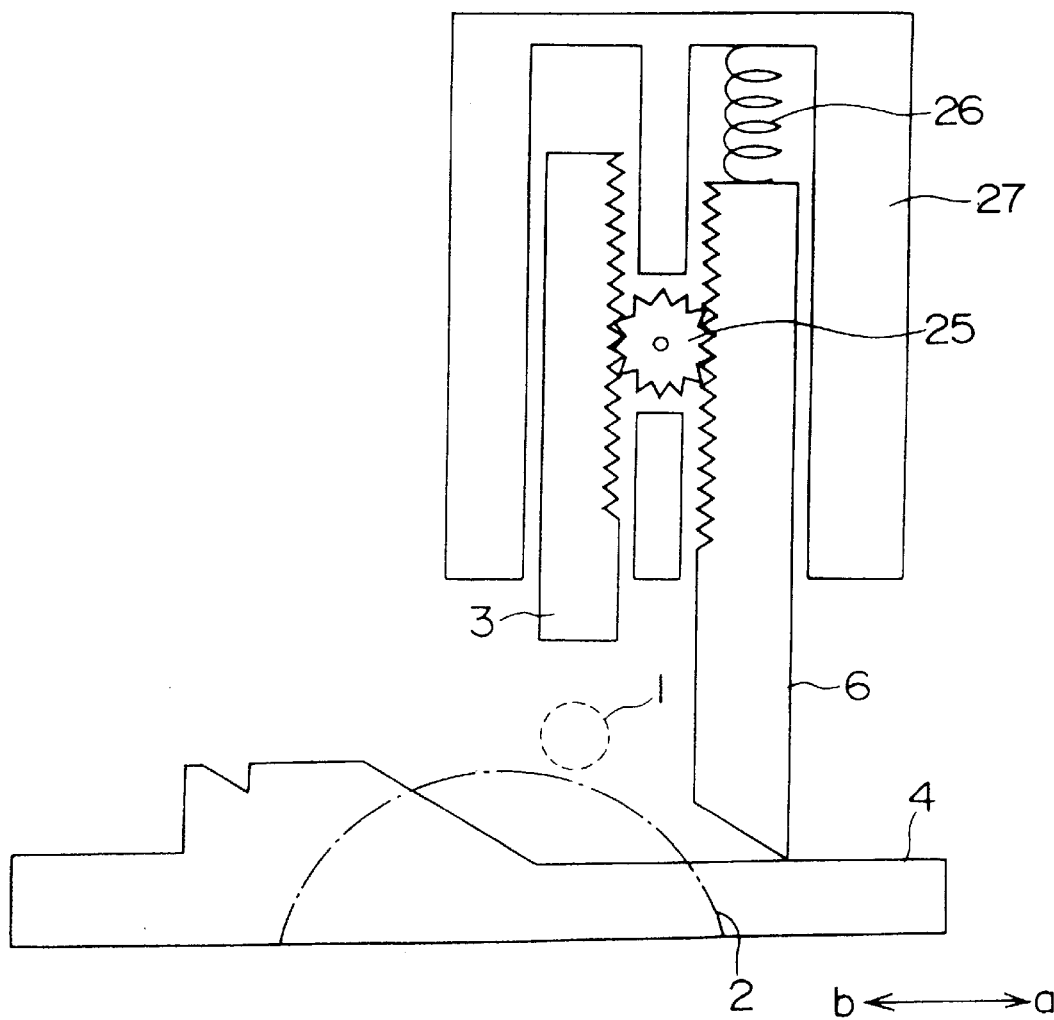
Figure 6:
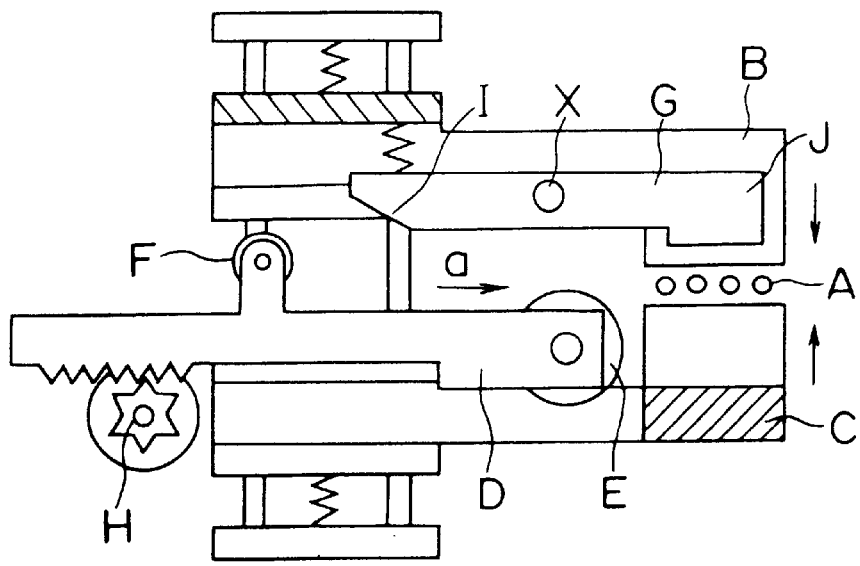
FIG. 6 is an explanatory view showing an example of a conventional optical fiber cleaver.
Figure 7:
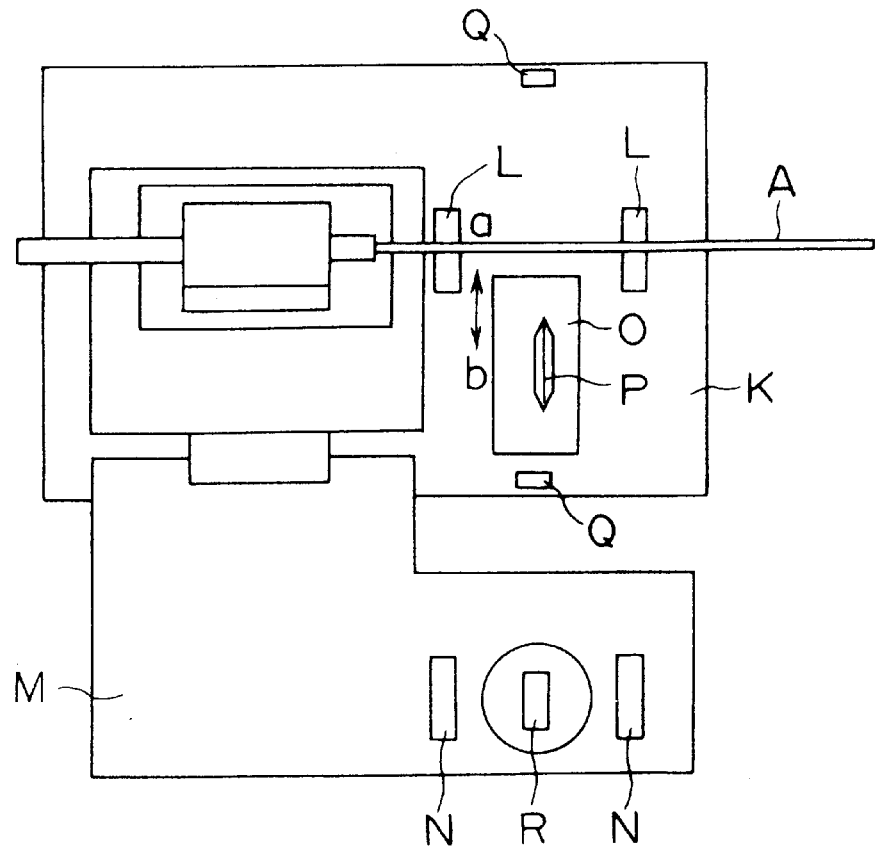
FIG. 7 is an explanatory view showing another example of a conventional optical fiber cleaver.

FIG. 4 shows an optical fiber cleaver according to a second embodiment of the present invention, in which the cam 4, pusher 3 and cam follower 6 in the cleaver of FIG. 1 are improved. Similar to the first embodiment, a cam 4 is fixed to the slider 13 and is shaped to have an uneven cam surface as shown in FIG. 4B. A pusher 3 and a cam follower 6 are independently provided on the lid plate 16 so that they can be moved directly along a thickness direction of the lid plate 16 in opposite directions by the presence of a gear 25 therebetween. That is to say, when the cam follower 6 is lifted the pusher 3 is lowered, and, when the cam follower 6 is lowered the pusher 3 is lifted. Incidentally, the cam follower 6 is protruded from a lower surface of the lid plate 16 by a coil spring 26 to be always contacted with the cam 4. Immediately after the slider 13 is slid in the direction a and the blade 2 shown by the broken line in FIG. 4B gives the scratch to the optical fiber 1, the cam follower 6 is gradually lifted along an ascent of the cam 4, and accordingly, the pusher 3 is gradually lowered, thereby applying stress to the optical fiber 1. When the slider 13 is further slid in the direction a and the application of the scratch to the optical fiber 1 is completed, the cam follower is dropped into a small concave after passing through a horizontal cam surface contiguous to the ascent, thereby preventing the cam 4 from being moved in the direction b.

Now, an example of usage of the optical fiber cleaver of FIGS. 4A and 4B will be explained.

(1) As shown in FIGS. 5A and 5B, the optical fiber 1 is set on the fiber resting table 10. In this case, the slider 13 is previously retarded in the direction b.
(2) The lid plate 16 in FIG. 1 is closed to pinch the optical fiber 1 between the clamp members 11, 12 and 17, 18 as shown in FIGS. 5C and 5D. In this condition, the cam follower 6 rides on the lowermost cam surface of the cam 4 and the pusher 3 is waiting above the optical fiber 1.
(3) The slider 13 is slid in the direction a.
(4) When the slider 13 reaches the position shown in FIG. 5E, the blade 2 gives the scratch to the lowermost part of the optical fiber 1. In this case, the cam follower 6 still contacts with the lowermost cam surface of the cam 4 and the pusher 3 is still waiting above the optical fiber 1 as shown in FIG. 5F.
(5) When the slider 13 reaches the position shown in FIG. 5G, the cam follower 6 is gradually lifted along the ascent of the cam 4 and thus the pusher 3 is gradually lowered, thereby bending the optical fiber 1 slowly to cleave it (FIG. 5H).
(6) When the slider 13 reaches the position shown in FIG. 5I, the cam follower 6 is dropped into the concave of the cam 4 to slightly lift the pusher 3 as shown in FIG. 5J and to prevent the cam 4 from sliding in the direction b.
(7) The lid plate 16 in FIG. 1 is opened to release the clamping of the optical fiber 1 by means of the clamp members 11, 12, 17, 18. Since the released optical fiber 1 is set on the fiber resting table 10 higher than the clamp members 11, 12, such optical fiber is jumped upwardly as shown in FIGS. 5K and 5L. Further, by opening the lid plate 16, the cam follower 6 is disengaged from the cam 4 completely, with the result that the slider 13 can be moved freely. Thus, the slider 13 can be shifted in the direction b for a next cleaving operation.

Industrial Availability

The optical fiber cleaver according to the first or second aspect of the present invention provides the following advantages:

1. Since the application of the scratch to the optical fiber by means of the blade is not repeated, undesired scratch is not given to the fiber.
2. Since the pusher is moved directly to push the optical fiber, even in a multi fiber ribbon fiber, uniform bending stress can be applied to all of the fibers, and, since there is no arc movement, unwanted force such as a twisting force is not applied to the optical fiber.

In the optical fiber cleaver according to the third aspect of the present invention, after the application of the scratch to the optical fiber by means of the blade is completed, since the pusher automatically pushes the optical fiber to cleave it, the cleaving operation can be performed by one action.

In the optical fiber cleaver according to the fourth aspect of the present invention, even after the optical fiber is cleaved by the pusher, the pusher can push the optical fiber continuously, the cleaved optical fibers can be prevented from being contacted with each other.

What is claimed is:

1. An optical fiber cleaver comprising:

a blade movable in a direction perpendicular to an optical axis of an optical fiber clamped and capable of giving a scratch to an outer peripheral surface of the optical fiber;

a pusher movable linearly in a direction perpendicular to the optical axis of the optical fiber clamped and configured to push the optical fiber to cleave the optical fiber at a portion where the scratch is given; and a reverse-running prevention mechanism including a cam and a cam follower, said cam being connected to said blade to be moved together with said blade, said cam follower being connected to said pusher and being slidable on said cam, said cam follower limiting a movement of said cam such that a movement of said blade is limited not to give further scratch to the optical fiber once the blade has given the scratch to the optical fiber.

2. An optical fiber cleaver comprising:

a blade configured to be moved in a first direction substantially perpendicular to an optical axis of an optical fiber to give a scratch to an outer peripheral surface of the optical fiber;

a pusher configured to push the optical fiber to cleave the optical fiber at a portion where the scratch is given;

a cam connected to said blade to be moved together with said blade; and a cam follower connected to said pusher and being slidable on said cam, said cam follower limiting a movement of said cam in a second direction opposite to the first direction such that a movement of said blade in the second direction is limited not to give further scratch to the optical fiber once the blade has given the scratch to the optical fiber.

3. The optical fiber cleaver according to claim 2, wherein said pusher is configured to push the optical fiber in a direction substantially perpendicular to both said first direction and the optical axis of the optical fiber.

* * * * *